Inventor:
Harry E. Pine

Oct. 4, 1932.   H. E. PINE   1,880,276
OPTICAL INSTRUMENT
Filed Aug. 11, 1928   3 Sheets-Sheet 3
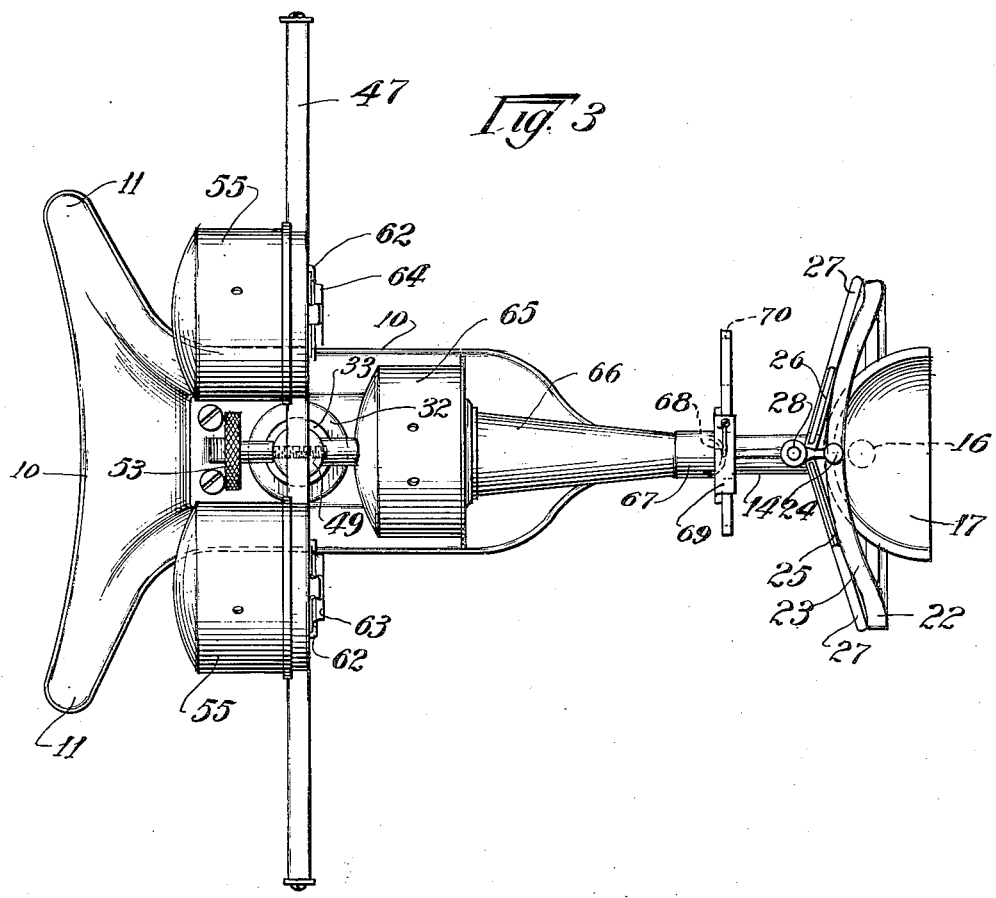
Fig. 3
Fig. 4
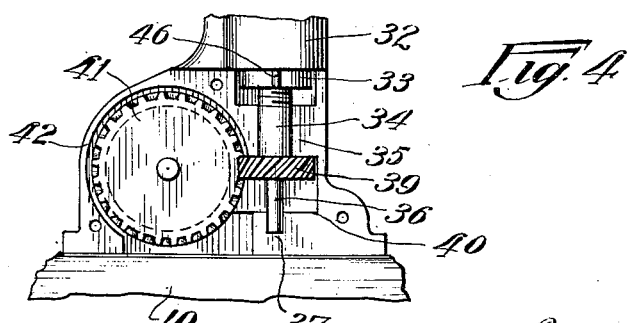
Inventor:
Harry E. Pine Patented Oct. 4, 1932

1,880,276

UNITED STATES PATENT OFFICE

HARRY E. PINE, OF CHICAGO, ILLINOIS, ASSIGNOR TO WILLIAM J. CAMERON, OF CHICAGO, ILLINOIS

OPTICAL INSTRUMENT

Application filed August 11, 1928. Serial No. 299,047.

My invention relates to optical instruments and more specifically my improvements appertain to an instrument to be used in exercising or stimulating a patient's eyes in and by response to light.

My device is operated upon the principle that the rhythmatic flashing or intermittent illumination of a target observed by the patient will cause the various muscles of the eye as well as the retina to react to sensations of light and dark, and by varying the speed with which the flashes are made the successive stimulations are controlled. This causes the exercise of the intrinsic muscles of the eye and the muscle bodies of the retina such as the cone-myoid and other elements of the retina which have for their function the translation of light functions. Also in crossed eyes (strabismus), by positioning the lights or targets so that each falls in the line of direct vision of the respective eye of the pair to be corrected, the two eyes can be trained in binocular recognition, fixation, fusion and other functions essential in the correction of strabismus. As a result of regulation of the speed of the flashes the periods of rest between the successive stimulations may be made always in the desired or recommended proportion to the period of stimulation. Thus, if the targets and the light are plain or in colors, or in different forms, there is a beneficial exercise of all the normal reactions to light of any intensity or color including the fusion faculty and other visual interpretations or ocular control. There is also a rhythmatic alternation of light and dark impressions upon the retina of the patient's eye or eyes.

It is therefore an object of my invention to provide an optical instrument having a wide range of adjustability so that it is effective and dependable in performing its functions, while at the same time it is economical to produce. Further objects of my invention reside in the provision of an optical instrument that embodies dependability and readiness of operation, durability of construction, simplicity and sturdiness in the formation and arrangement of the various parts, accessibility for the purpose of adjustment, and the entire instrument is fabricated, and its parts are arranged or assembled in a novel and economical manner, which permits its being retailed for a reasonable price to the user.

I prefer to carry out my invention and to accomplish the several objects thereof, in substantially the manner hereinafter fully described and as more particularly pointed out in the claims, reference being made to the accompanying drawings that form a part of this specification.

In the drawings:—

Fig. 3 is a top or plan of the structure shown in Fig. 1.

Fig. 4 is a detail of the elevating mechanism for vertically adjusting the targets.

The drawings, it will be understood, are more or less schematic and are for the purpose of disclosing a typical or preferred embodiment of my invention, and in these drawings similar reference characters have been employed to identify like parts wherever they appear throughout the several views.

Figure 1:
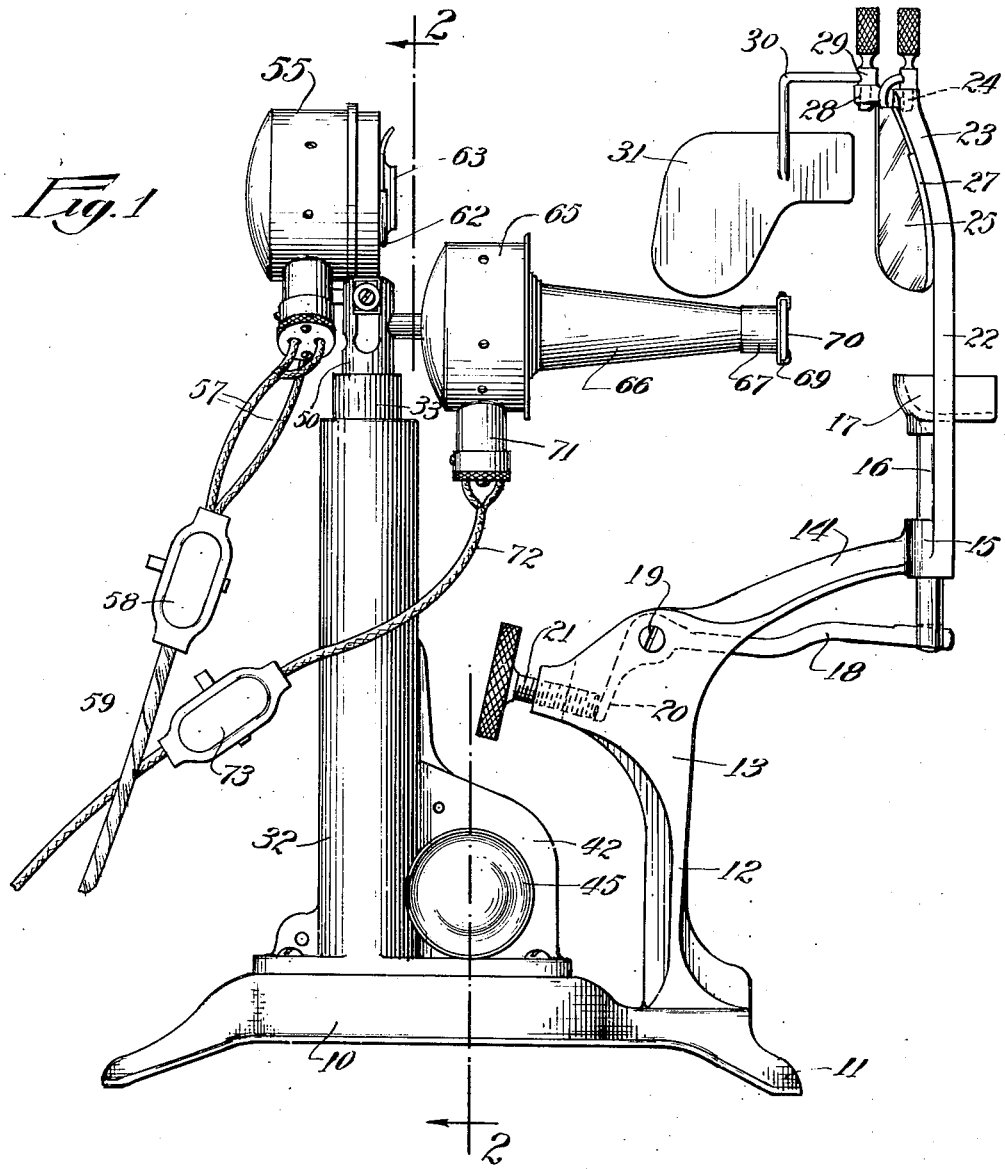
Fig. 1 is a vertical side elevation of my novel optical instrument.

The instrument, generally speaking, consists of a standard and an upright arm upon the latter of which a chin-rest is provided to support the patient's head, while upon the standard there is mounted means for producing the colored lights or illuminated targets that are to be observed by the patient, and means are provided for causing an intermittent illumination. The lights or illuminated targets are adjustable towards and away from each other and they may be bodily raised and lowered according to the plane in which the patient's eyes are positioned or tilted for the purpose of placing each target in the line of direct vision of the respective eye according to the defects found in the relative positions of the two axes of the patient's eyes.

The base 10 is of a substantially triangular shape so that three supporting feet 11 are provided. Above the foot nearest the patient there is an upright arm 12 of irregular shape, the intermediate portion of which forms an enlargement 13 from which an extension 14 projects in a plane that is oblique to the horizontal. The end of the extension 14 has a bearing boss 15 to receive the vertically sliding spindle 16 on the upper end of which a dished chin rest 17 is supported. The lower end of the spindle 16 is engaged with the adjacent portion of the long arm 18 of a bell-crank lever, which lever is pivoted at its elbow upon the screw or pivot pin 19 passed transversely through a recess formed in the embossment 13. The shorter arm 20 of the bell-crank is housed within the recess where it is in a position to be engaged by the inner end of a thumb screw 21 that screws into a tapped bore made in the adjacent portion of the embossment 13. By rotating the thumb screw in one direction or the other the bell-crank is rocked thus causing a raising or lowering of the chin rest 17 to suit the particular patient.

A substantially arch-shape frame is formed integrally with the arm 14 and boss 15, and consists of vertical side members 22 the lower end portions of which curve inwardly toward each other and meet at the boss 15, while the upper arch-shaped portions 23 of the members are bowed slightly away from the vertical as seen in Fig. 1 so that the forehead of the patient will rest against it when the head is supported on the chin-rest 17.

At the upper central portion of the arch 23 there is a socket or recess to receive a vertically disposed stud 24 to afford support for a pair of bi-chromatic scopes in the form of colored plates 25 and 26, the former being of red glass and the latter of blue-green glass. These scopes of complementary colors when placed before both eyes and the targets illuminated in the same complementary colors will eliminate one color to each eye with the effect that the patient sees two targets but only one with each eye. For example, the eye behind the red scope will see only the red target, and the eye behind the blue-green scope will see only the blue-green target, thus disassociating the two eyes. These plates are mounted in a pair of grooved frames or holders 27 that permit their ready removal whenever it is desired to replace them. The frames 27 are a part of and are connected with the stud 24 so that the scopes may be removed by lifting the stud out of its socket. The frames are in planes oblique to each other and at the angle formed at their meeting edges there is a small boss 28 that is vertically bored to receive a removable pin 29 having an L-shaped arm 30 of angular shape projecting laterally from it, which arm at its lower end is provided with a septum or swinging plate 31 that is adapted to be removably and swingingly positioned in front of the patient's eyes.

A standard 32 arises from the portion of the base that is opposite the arm 12, and said standard is hollow or tubular and telescopes on a secondary tube or extension 33 that is adjustable up and down in said standard 32. The extension standard 33 is internally bored and threaded and a threaded bolt 34 screws into the same from its lower end. The lower portion of the bolt 34 is smooth and unthreaded and extends through a bearing 35 in the lower portion of standard 32, below which it is reduced in diameter as at 36 so as to enter and rest in a socket or recess 37 at the bottom of standard 32. Below the bearing 35 the bolt has a worm gear 39 secured to it that rotates in a pocket 40 made in the adjacent lower portion of the standard and the teeth of this gear are engaged by a worm-wheel 41 disposed transversely to it upon a horizontal axis. The worm-wheel is enclosed within a housing 42 in the form of a hollow extension that projects from the lower portion of standard 32 and for the purpose of accessibility I have provided a removable closure plate or door 43 that form a part of the standard and housing. The worm-wheel is mounted upon a spindle 44 having bearings in opposite walls of the housing extension and one end of said spindle projects beyond its bearing and is provided with a hand-wheel 45 by which it may be rotated. Thus it will be seen that by turning the hand-wheel in one direction or the other the worms are rotated together with the screw 34 which causes the raising or lowering of the extension standard 33. Rotation of the extension standard is prevented by providing a feather or rib 46 on its outer portion that co-operates with a correspondingly formed channel upon the interior of the main standard 32.

At the upper end of the standard structure there is a cross-arm 47 upon which the illuminated targets or images are carried. This cross-arm, intermediate its ends, is mounted upon a transverse pin 48 that passes through the bifurcated portion 49 of a plug 50 that is inserted in the upper smooth bore of the standard member 33. Intermediate its ends the plug is reduced to provide a shoulder 51 that rests upon the upper ends of standard member 33 and at its inner end it is provided with a longitudinal slot 52 so that it will frictionally engage the walls of the smooth bore of the standard and prevent its accidental rotation. The pivot pin 48 has its outer end formed with a hand-wheel 53 so that by rotating the latter to turn in the screw the opposite parts of the bifurcation will be drawn towards each other and will frictionally engage the cross-arm 47, to maintain it in position. The cross-arm it will be understood is rectangular in cross section and on account of its being frictionally maintained in position it may be tilted to the desired angle out of horizontal to take care of deviations of the optical axes of different patients.

Mounted upon the cross-arm are slides 54, one on each side of pivot 48, and said slides are preferably in the form of elongated tubes of rectangular cross-section and of such inner dimensions as to frictionally engage the cross-arm 47 so that they may be slid towards and away from the ends and center of the arm. Connected with and carried by these slides are the targets in the form of lamp houses 55 having tubular terminal sockets 56 and within the housings 55 there are mounted suitable electric lamps or bulbs. The current for these lamps is derived from conductors 57 that lead from the respective sockets 56 to a button switch element 58 and from thence the conductors lead to any suitable source of electric energy by a cable or cord 59.

Interposed in this cord is a make-and-break device 60 of the common construction known as a "flasher" and said device, as shown in the drawings, has a plug portion that is screwed into a service tap and has a socket portion to receive the terminal plug 61 at the end of the cable 59, thus permitting the current to flow through the "flasher" 60 before reaching the lamps. Other means may be employed instead of the "flasher" herein shown; for example, the "flasher" need not be used and the operator may turn the switch 58 on and off at stated intervals thus intermittently causing an illumination of the targets or images.

The lamp housings 55 are of a drum-like shape and the heads facing the patient are provided with windows that are partly surrounded by grooved holders 62 that receive complementary colored lens 63 and 64, for example, the former being colored red and the latter colored blue green. These lens are preferably of translucent glass so that the direct rays of light from the lamps within the housings will not be emitted through the windows in said housings. When the bulbs or lamps are illuminated the patient will see the illuminated targets through the scopes 25 and 26, thus causing the eyes to move in the manner prescribed for muscular exercise.

Connected to the upper portion of the standard structure or to the plug 50 is a centrally disposed lamp house 65 of a shape similar to the lamp houses 55 and in the head nearest the patient there is a large window to which an elongated conical tube 56 is connected for projecting light, for the purpose of providing a third target in a plane or axis other than those mounted on the cross-arm 47. The outer end of the tube has a cylindrical part 67 in which a condensing lens 68 is positioned. Across the end of the tube there is an oppositely channeled slide-holder 69 and a slide 70 is movable in the channels transversely in front of the lens 68. The slide carries a plurality of plates or lens of different colors which may be brought into registry with the open end of the tube to produce light tones in different colors for stimulating response of the eye to various colors of the spectrum. The lamp house 65 has a socket element 71 to receive the lamp or bulb and derives its current through conductors 72 that lead to a suitable source of electric current and have a push button switch 73 interposed therein so that the current may be turned on or off by the operator whenever it is desired to illuminate the tube 66.

Figure 2:
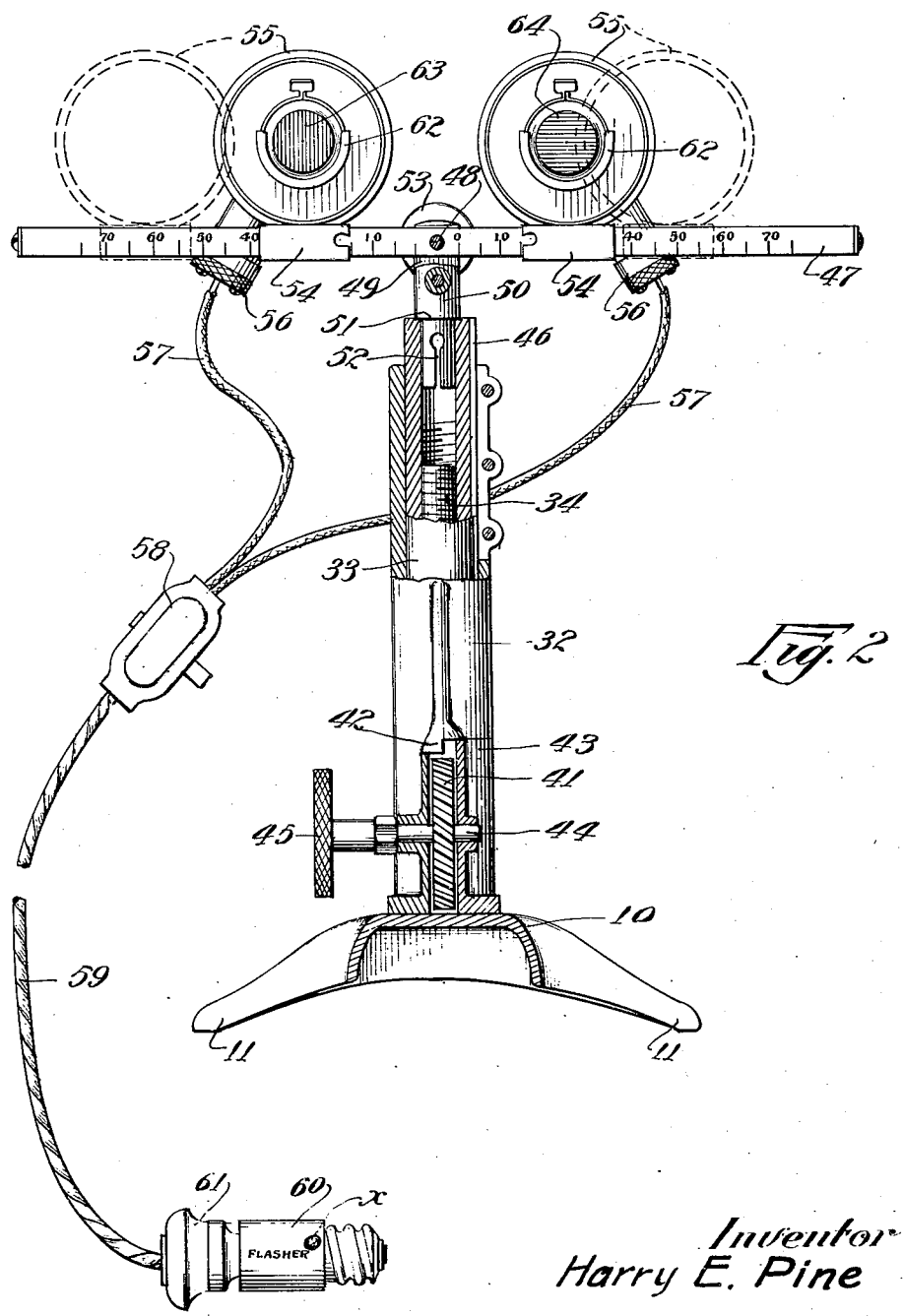
Fig. 2 is a vertical transverse section thereof taken on line 2—2, of Fig. 1 and looking in the direction indicated by the arrows.

Because of the fact that the housing 65 is carried by the movable member of the standard it may be raised or lowered by adjusting the hand-wheel 45. Before reaching the lamp the current passes through a flasher similar to the member 60 heretofore described, and when this part of the structure is in use the light is flashed directly into the patient's eye, and the color may be changed at will. The flasher shell is apertured as shown in Fig. 2 to permit access to an adjusting set-screw $x$ by the rotation of which in one direction or the other the lengths of the flashes and the periods of rest between them may be controlled.

What I claim is:—

1. An optical exerciser comprising a standard, a cross-bar mounted thereon, lamp houses carried by said bar and having apertures facing the patient, translucent colored target plates covering said apertures, a bracket in front of said lamp houses, complementary colored scopes on said brackets through which the targets are viewed by the patient, electric conductors leading to said lamp houses, and a make-and-break device interposed in said conductors.

2. An optical exerciser comprising a standard, a tiltable cross-bar fulcrumed intermediate its ends on said standard, lamp houses carried by said bar and having apertures facing the patient, translucent colored target plates covering said apertures, a bracket in front of said lamp houses, complementary colored scopes on said brackets through which the targets are viewed by the patient, electric conductors leading to said lamp houses, and a make-and-break device interposed in said conductors.

3. An optical exerciser comprising a standard, a cross-bar mounted thereon, lamp houses carried by said bar and having apertures facing the patient, translucent colored target plates covering said apertures, a bracket in front of said lamp houses, complementary colored scopes on said brackets through which the targets are viewed by the patient, an opaque septum intermediate said scopes and in a plane intersecting the planes of said scopes, electric conductors leading to said lamp houses, and a make-and-break device interposed in said conductors.

4. An optical exerciser comprising a standard, a cross-bar mounted thereon, lamp houses adjustably slidable on said bar and having apertures facing the patient, translucent colored target plates covering said apertures, a bracket in front of said lamp houses, complementary colored scopes on said brackets through which the targets are viewed by the patient, electric conductors leading to said lamp houses, and a make-and-break device interposed in said conductors.

5. An optical exerciser comprising a standard, a cross-bar mounted thereon, lamp houses adjustably slidable on said bar and having apertures facing the patient, translucent colored target plates covering said apertures, a bracket in front of said lamp houses, complementary colored scopes on said brackets through which the targets are viewed by the patient, an opaque septum intermediate said scopes and in a plane intersecting the planes of said scopes, electric conductors leading to said lamp houses, and a make-and-break device interposed in said conductors.

6. An optical exerciser comprising means for displaying and relatively moving illuminated colored images in front of a patient, said images being capable of assuming various positions with respect to each other, complementary colored scopes interposed between said images and the patient's eyes, and means for causing rhythmatic illumination and non-illumination of the images.

7. An optical exerciser comprising a support, a tiltable cross-arm thereon, colored images carried by said cross-arm and adjustable relative to each other, complementary colored scopes through which the images are viewed, and means for illuminating said images.

8. An optical exerciser comprising a support, a tiltable cross-arm thereon, colored images carried by said cross-arm and adjustable relative to each other, complementary colored scopes through which the images are viewed, and means for illuminating said images, said means including make-and-break devices that cause rhythmatic flashing of the illuminating means.

Signed at Chicago, Cook County, Illinois, this 8th day of August, 1928.

HARRY E. PINE.